H. L. HOPKINS.
TRACK-CLEARERS FOR HARVESTERS.

No. 192,998. Patented July 10, 1877.

Attest:
H. L. Perrine
Wm. A. Neale

Harvey L. Hopkins,
Inventor.

By.
Attorney.

UNITED STATES PATENT OFFICE.

HARVEY L. HOPKINS, OF MANCHESTER, IOWA.

IMPROVEMENT IN TRACK-CLEARERS FOR HARVESTERS.

Specification forming part of Letters Patent No. 192,998, dated July 10, 1877; application filed April 24, 1877.

*To all whom it may concern:*

Be it known that I, HARVEY L. HOPKINS, of Manchester, in the county of Delaware and State of Iowa, have invented a new and useful Improvement in Track-Clearers for Harvesters, of which the following is a full, clear, and exact description.

This invention relates to track-clearers composed of two prongs, the bottom one of which clears the track while the top one gives proper direction to the upper ends of the spears of the cut grass.

In track-clearers as heretofore constructed, whether composed of two prongs or of a board and a prong, no means are provided for regulating the width of the track under varying conditions, and the device clearing the track is so devised as to meet the supposed extreme condition, so that so much of the side draft of the machine as is due to the track-clearer will be substantially the same, whatever the nature of the grass and the state of the weather may be. This is an objection, both as regards the side draft and the unvarying width of the track, appreciated by all familiar with the use of mowing-machines.

The object of my invention is to overcome these objections and provide a track clearer adapted to clear a wide or a narrow track, according as the nature of the grass and the state of the weather may dictate to the operator. To this end, it consists in making both prongs adjustable, as will be more fully set forth hereafter.

Figure 1:
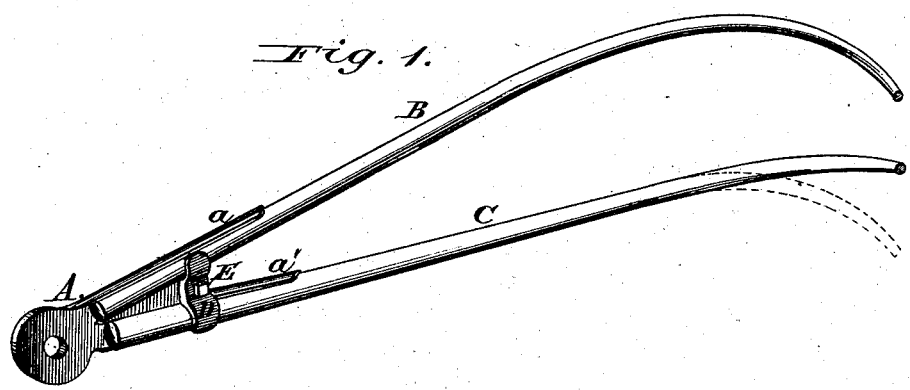
Figure 2:
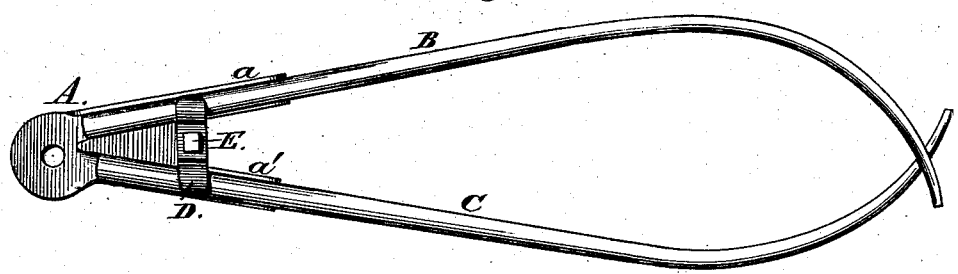
Figure 3:
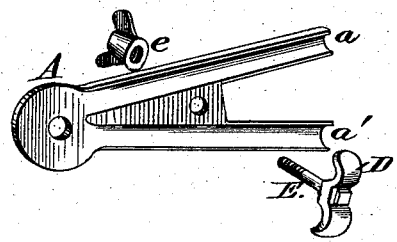

In the annexed drawings, Figure 1 is a perspective view of my improved track-clearer. Fig. 2 is a side elevation thereof, showing the prongs in a different position. Fig. 3 illustrates, in perspective, the iron to which the prongs are attached and the means for securing them thereto.

The same letters of reference indicate like parts in all the figures.

The iron A, which is to be pivoted to the outer shoe, has two diverging open-sided sockets, $a$ and $a'$, curved in cross-section to fit the round prongs B and C, which are seated therein, clamped in any desired position by plate D and bolt E, the nut $e$ of which presses against the outer side of iron A.

By loosening the nut the hold on the prongs is released, so that they can be turned in their sockets to throw their curved ends toward or from each other more or less, according as circumstances may require. The prongs may also be adjusted longitudinally, if occasion requires it.

The axial adjustment of the lower prong is not so much intended to affect its action on the standing grass as on the adjacent cut grass, which will be raked out of the way to a greater or less width, or simply lifted up more or less, according to the position of the curved end of the prong. The range of adjustment of the upper prong is also materially enlarged by the concurrent adjustment of the lower prong.

What I claim as my invention, and desire to secure by Letters Patent, is—

1. A track-clearer composed essentially of two prongs, both adjustably connected so that their curved ends can be thrown toward and from each other, and means for holding the prongs rigidly in any desired position, substantially as and for the purpose specified.

2. The combination, substantially as specified, of the track-clearer iron, provided with sockets, the curved prongs adjustably seated in said sockets, and the clamping-plate, and bolt and nut.

In testimony whereof I have signed my name to the foregoing specification in the presence of two subscribing witnesses.

HARVEY L. HOPKINS.

Witnesses:
MARTIN CONNOLLY,
CHAS. A. NEALE.